(12) United States Patent
Ubaldi

(10) Patent No.: US 10,827,678 B2
(45) Date of Patent: Nov. 10, 2020

(54) AGRICULTURAL MACHINE LIFTING UNIT

(71) Applicant: ROC S.R.L., Poggio Torriana (RN) (IT)

(72) Inventor: Raffaele Ubaldi, Santa Giustina (IT)

(73) Assignee: ROC GROUP S.R.L., Poggio Torriana (IT)

( * ) Notice: Subject to any disclaimer, the term of this patent is extended or adjusted under 35 U.S.C. 154(b) by 134 days.

(21) Appl. No.: 15/883,317

(22) Filed: Jan. 30, 2018

(65) Prior Publication Data

US 2018/0213723 A1    Aug. 2, 2018

(30) Foreign Application Priority Data

Feb. 1, 2017    (IT) .................... 102017000010720

(51) Int. Cl.
*A01D 67/00*    (2006.01)
*A01D 78/10*    (2006.01)
(Continued)

(52) U.S. Cl.
CPC ............ *A01D 67/005* (2013.01); *A01B 63/22* (2013.01); *A01D 34/246* (2013.01); *A01D 57/20* (2013.01);
(Continued)

(58) Field of Classification Search
CPC .... F16F 9/00; F15B 15/1409; B60G 2500/30; B60G 2300/083; B60G 2300/08;
(Continued)

(56) References Cited

U.S. PATENT DOCUMENTS 3,869,861 A * 3/1975 Case .................... A01D 41/145
60/413
4,622,884 A    11/1986 Buchl
(Continued)

FOREIGN PATENT DOCUMENTS

DE          4308020 A1 *  9/1994  .......... F15B 13/0402
DE    102004025522 A1    12/2005
(Continued)

OTHER PUBLICATIONS

Italian Search Report dated Oct. 5, 2017 for counterpart Italian Application No. IT 201700010720.
(Continued)

*Primary Examiner* — Arpad Fabian-Kovacs
(74) *Attorney, Agent, or Firm* — Shuttleworth & Ingersoll, PLC; Timothy J. Klima

(57) ABSTRACT

An agricultural machine includes a frame, and a lifting unit configured to vary a height of an operating unit with respect to a supporting surface for the machine. The lifting unit includes hydraulic cylinder with a liner and first and second pistons both slidingly housed inside the liner and arranged in series to define first and second chambers inside the liner, wherein the first and second pistons are controllable independently. The lifting unit includes a pressure stabilizer in fluid connection with the first chamber and that controls a pressure in the first chamber so that the first piston moves therein as a force generated on the first piston varies. A second control element for the second chamber carries out a volumetric control of the second chamber to control a position of the second piston regardless of a pressure inside the second chamber.

12 Claims, 8 Drawing Sheets

Figure 1:
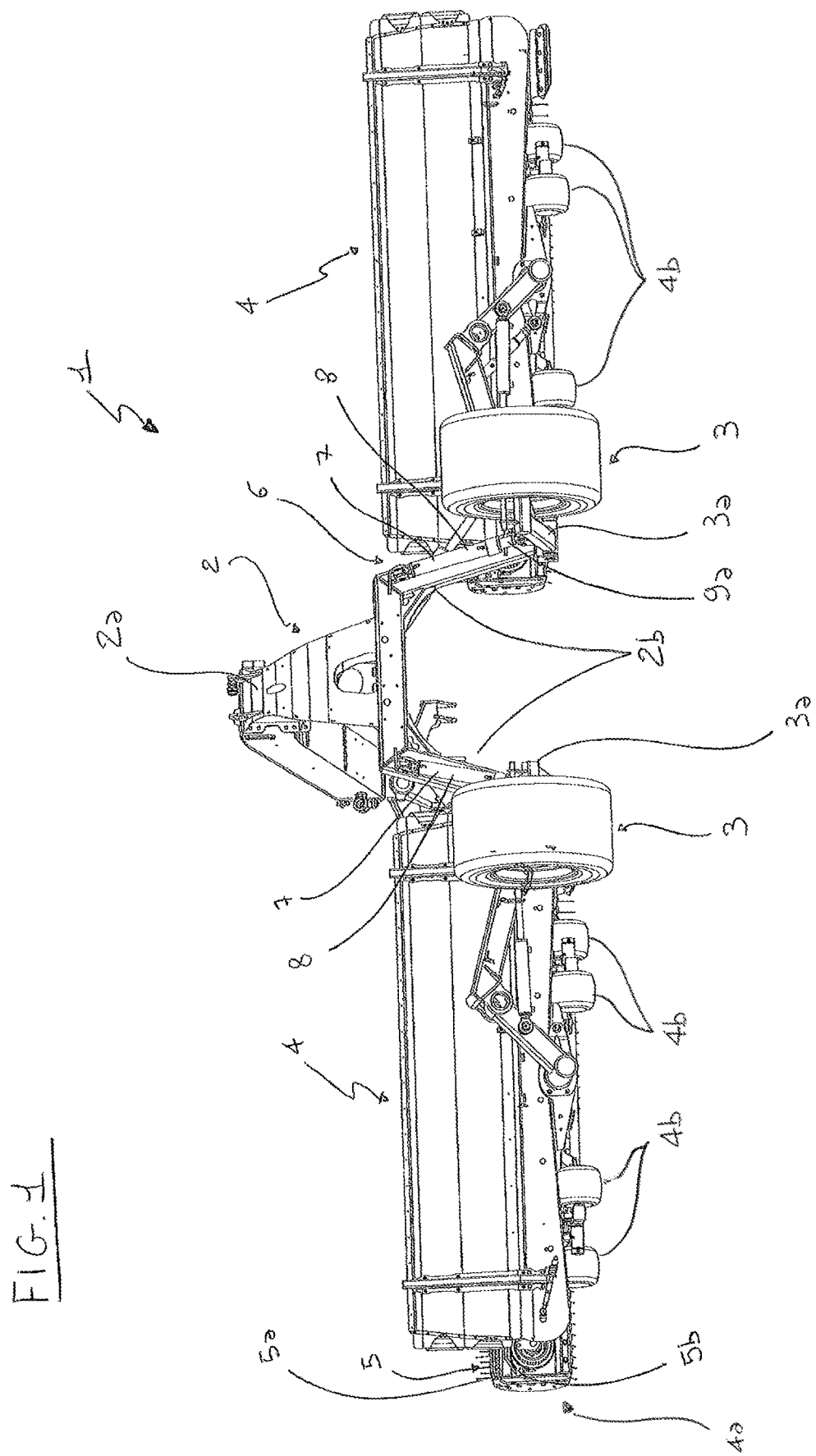

(51) Int. Cl.
*A01D 89/00* (2006.01)
*A01D 34/24* (2006.01)
*A01D 57/20* (2006.01)
*A01B 63/22* (2006.01)
*F16F 9/00* (2006.01)
*B60G 17/0165* (2006.01)
*B60G 3/14* (2006.01)
*F15B 15/14* (2006.01)
*A01D 84/00* (2006.01)

(52) U.S. Cl.
CPC ....... *A01D 78/1014* (2013.01); *A01D 89/004* (2013.01); *B60G 3/145* (2013.01); *B60G 17/0165* (2013.01); *F16F 9/00* (2013.01); *A01D 84/00* (2013.01); *B60G 2200/132* (2013.01); *B60G 2202/413* (2013.01); *B60G 2300/08* (2013.01); *B60G 2300/083* (2013.01); *B60G 2500/30* (2013.01); *F15B 15/1409* (2013.01)

(58) Field of Classification Search
CPC ........ B60G 2202/413; B60G 2200/132; B60G 17/0165; B60G 3/145; A01D 67/005; A01D 57/20; A01D 34/246; A01D 89/004; A01D 78/1014; A01D 84/00
See application file for complete search history.

(56) References Cited

U.S. PATENT DOCUMENTS

| | | | |
|---|---|---|---|
| 5,794,424 A | * | 8/1998 | Ermacora .............. A01D 34/64 56/15.1 |
| 6,318,477 B1 | | 11/2001 | Bettin |
| 2004/0200203 A1 | | 10/2004 | Dow et al. |
| 2011/0162719 A1 | * | 7/2011 | Lundgren ........... F15B 15/1409 137/1 |
| 2015/0319928 A1 | | 11/2015 | Ubaldi |
| 2017/0034989 A1 | * | 2/2017 | Westlind ................ A01B 63/22 |

FOREIGN PATENT DOCUMENTS

| | | | | |
|---|---|---|---|---|
| DE | 102007020744 A1 | | 8/2008 | |
| DE | 102008056717 A1 | * | 7/2010 | ............ F02B 71/045 |
| DE | 102011121777 A1 | * | 6/2013 | ........... A01D 34/661 |
| EP | 0495210 A1 | | 7/1992 | |
| EP | 1800529 A1 | | 6/2007 | |
| EP | 2789223 A1 | | 10/2014 | |
| IT | BO2014A000272 | | 5/2014 | |
| WO | WO2010002339 A1 | | 1/2010 | |

OTHER PUBLICATIONS

European Office Action dated Aug. 20, 2019 from counterpart European App No. 18152967.8.

* cited by examiner

AGRICULTURAL MACHINE LIFTING UNIT

This application claims priority to Italian Patent Application 1 0201 700001 0720 filed Feb. 1, 2017, the entirety of which is incorporated by reference herein.

The present invention relates to an agricultural machine, in particular a lifting and lightening system for an operating unit of an agricultural machine.

Therefore, the present invention has its main application in the agricultural sector, preferably in equipment provided with a device for collecting agricultural products having a long-line form (such as grass, straw, legumes, biomass products and the like), which mostly need to "follow" the contour of the ground for optimal collection of the products.

An example of such collection devices is the swather (or windrower), i.e. a device provided with a collection or pick-up assembly extending transversely to the direction of advancement of the machine (a traction or self-propelled unit), and a discharge system, with a belt or screw conveyor, configured to convey the collected products to the sides or the rear of the machine.

These devices are usually provided with a frame connected to a traction unit and equipped with wheels/crawler tracks, on which the operating units or pick-ups are mounted, which in turn are equipped with small rolling wheels or slides that are required for adaptation to the ground during operation.

In the prior art, therefore, one of the problems concerning the use of these devices consists in the need to distribute the weight of the operating unit so that it does not rest completely on the rolling wheels at the base thereof, which in this case run the risk of sinking into the ground of the field to be tilled.

In this light, the prior art proposes a few solutions to this problem, the first of which provides for completely uncoupling the rigid movement of the operating unit from the weight distributing/lightening effect.

In such a solution, in fact, the prior art provides for the use of a pair of single- or double-acting hydraulic cylinders operatively interposed between the frame and the two support wheels of the machine, ensuring through these cylinders that the frame (and therefore the pick-up(s)) is at a predetermined height with respect to the ground.

In this light, when the cylinders are completely closed, the pick-ups are completely lowered, basically in the working position, whereas when the cylinders are completely extracted, the pick-ups are completely raised, in the transport position.

To guarantee the aforementioned "lightening", i.e. the distribution of the weights, the pick-ups are in turn connected to the frame by means of suitable hydraulic implementations, wherein the pick-ups are enabled to follow the ground through the use of accumulators and by appropriately adjusting the working pressure of the cylinders.

Disadvantageously, though being partly functional, this solution is very complex and troublesome, both due to the need to use two different types of cylinders differently positioned in the machine, and because it prevents the cylinders interposed between the pick-up and the frame from being specially designed only for folding.

Moreover, in the absence of a folding system, and therefore in machines in which the only envisaged movement is the oscillation of the pick-ups moving towards/away from each other, this system would be unnecessarily complex.

An example of such machines is found in patent IT1423600 in the name of the same Applicant.

A further known solution, instead, involves the coupling of the lifting cylinder and the "suspension" cylinder, thus uniting their rods.

In other words, in such a solution a single rod is slidably associated at both its ends with a first liner and a second liner.

This solution, while obviating the problem of excessive overall dimensions, introduces further critical issues into the system.

In fact, with this configuration, the two strokes of the cylinders (single- and double-acting) are arranged in series and therefore cumulated, which although solving the problem of the overall dimensions in the machine, adds that of the excessive length and/or the low operating flexibility of the cylinder.

In this light, the object of the present invention is to provide an agricultural machine capable of obviating the above-mentioned drawbacks of the prior art.

More precisely, the object of the present invention is to provide an agricultural machine that allows maximum versatility of use and reduced overall dimensions.

Moreover, the object of the present invention is to provide a better-performing agricultural machine.

Said objects are achieved by means of an agricultural machine having the features of one or more of the ensuing claims.

In particular, the machine comprises a frame and at least one operating unit (preferably provided with a collecting member) connected to the frame.

Such a machine further comprises at least one wheel or crawler track rotatably attached to the frame to allow the movement of the machine on a supporting surface.

A lifting unit is also provided, which is operatively interposed between the frame and the wheel (or between the frame and the operating unit).

This lifting unit is configured to vary the height of the operating unit with respect to the supporting surface of the machine.

In other words, the lifting unit is configured to vary the height (understood as the distance from the supporting surface) of the operating unit with respect to the frame and/or to directly raise or lower the frame with respect to the wheel, and therefore with respect to the supporting surface (i.e. the ground).

According to one aspect of the present invention, the lifting unit comprises at least one hydraulic cylinder provided with a liner, a first and a second piston, both slidably housed inside the liner.

These pistons are preferably arranged in series inside the liner to define at least a first and a second chamber inside the liner.

These hydraulically isolated chambers have a variable volume depending on the positioning of the pistons inside the liner.

Therefore, the pistons substantially share the same working stroke (net of the cylinder head(s)), each one being able to exploit it completely or partially according to the position of the other.

In this regard, preferably, the first and the second piston are controllable independently of each other.

Advantageously, in this way, the second piston can be used to cause lifting, thus determine the position, of the operating unit with respect to the ground, which then abuts against the first piston, while the first piston can act as a suspension.

The fact that both pistons share the same stroke and are controllable independently of each other allows the functionality of the machine to be adjusted with maximum versatility and minimum overall dimensions.

Preferably, in order to allow the above-mentioned functionalities, the first chamber is controlled by pressure while the second chamber is controlled by volume (or position of the piston).

Therefore, the machine comprises a control circuit configured to control the pressure in the first chamber and the volume of the second chamber.

The above is particularly advantageous in embodiments in which the operating unit has at least one (rolling) element resting on the ground.

Advantageously, in fact, by controlling the volume in the second chamber (and by suitably adjusting the maximum pressure valve) the position of the second piston inside the liner is guaranteed, allowing the operator to have maximum certainty about the position of the operating unit and/or the frame during lifting.

Similarly, pressure control in the first chamber allows the first piston to move therein as the force discharged by the wheel (or the operating unit) onto the ground varies.

In fact, when the operating unit, for example, runs into a bump during travel, the machine's weight discharged by the operating unit onto the supporting surface increases, actually unloading the wheel and hence the first piston, which reduces the pressure in the first chamber.

Pressure control in the chamber, in fact, aims at avoiding such an occurrence (whereby the wheels of the operating unit would risk sinking into the ground) by increasing the pressure in the chamber in order to redistribute the weight on the first piston, thus bringing back the balance of weights into the correct configuration.

On the contrary, when the operating unit runs into a depression, the first chamber undergoes an increase in pressure since the first piston must also support the share of weight normally supported by the operating unit, which in the absence of control would lead to detachment of the operating unit from the ground and therefore to non-operation of the machine.

Pressure control further allows the first piston to respond to the increase in pressure with a corresponding decrease in volume in the first chamber, thus restoring the reference pressure and again bringing back the balance of weights into the correct configuration.

Therefore, in a working configuration in which the second piston is positioned so that the height of the operating unit is sufficiently low to allow it to rest on the ground, the weight of the operating unit is partly discharged onto the ground by said supporting element (or wheel/slide); the first piston is thus controlled so that the first chamber is set at a pressure such as to support a share of said weight (preferably at least 60%) in order to decrease the weight supported by the supporting element of the operating unit.

In this way, the operating unit remains in constant contact with the ground, following its contour, and the first piston is moved accordingly so that the contact pressure of the (rolling) supporting element, or wheel, remains constant (and reduced).

These and other features will become more apparent from the following illustrative, and therefore non-limiting, description of a preferred, thus non-exclusive, embodiment of an agricultural machine according to the present invention as shown in the accompanying drawings, wherein:

FIG. 1 shows a rear perspective view of an agricultural machine according to the present invention;

Figures from 2 to 4 show side perspective views of the machine of FIG. 1 in different operating configurations, with some parts removed to highlight others;

Figures from 5 to 8, instead, show views in longitudinal section of a detail of the agricultural machine of FIG. 1.

With reference to the accompanying figures, the numeral 1 indicates an agricultural machine according to the present invention.

Preferably, the agricultural machine 1, which is the object of the invention, is of the type provided with at least a frame 2, a wheel 3 (or crawler track) and an operating unit 4 configured to perform an operation with respect to a supporting surface "A", i.e. the ground.

The operations for which the present invention is particularly advantageous are the gathering of long line-shaped agricultural products (e.g. grass, straw, etc.) or the cutting thereof.

Therefore, the present invention has its main, but not exclusive, application in agricultural machines 1 such as swathers, pick-ups, mowers etc., namely machines configured to follow the contour of the ground and perform the tilling at a predetermined height with respect to the ground itself.

Such agricultural machines 1 can indiscriminately be towed machines, thus moved by a traction unit, or self-propelled machines.

The frame 2, which as said can be integrated into a self-propelled machine or connected to a traction unit, is configured to support the operating unit 4 (or operating units) and is provided with one or more wheels 3 (or crawler tracks) resting on the ground.

Preferably, the frame 2 is located in a central area at the sides of which at least two operating units 4 extend away from each other.

At least two wheels 3 are arranged at a lower portion of the frame.

Therefore, the wheels 3 define the primary contact element through which the machine 1 contacts the supporting surface "A".

Preferably, each wheel is designed to support at least one of said operating units 4, thereby balancing the agricultural machine 1.

In the preferred embodiment, the frame 2 comprises a central body 2a (mechanically and hydraulically) connectable to the traction unit and two lower supporting arms 2b, each associated with at least one wheel 3 (or crawler track).

The operating unit 4 preferably extends transversely to the direction of movement of the traction unit (and preferably transversely to the frame) and comprises at least one operating unit 4a adapted to interact with the agricultural products (to be cut or gathered) lying on the ground.

Preferably, the operating unit is a pick-up assembly 5.

Such a pick-up assembly 5 is provided with a plurality of longitudinal prongs 5a, which can rotate around an axis extending along the main direction of the unit so as to collect, like a rake, the agricultural products lying on the ground.

Moreover, this pick-up assembly 5 comprises a discharge unit 5b arranged operatively downstream of the pick-up assembly 5a and configured to move the gathered products in a predetermined direction in order to discharge the products at the sides or at the back of the operating unit 4.

Preferably, the discharge unit 5b can be defined by a belt or screw conveyor.

Furthermore, in view of the need for the operating unit 4 to follow the contour of the ground on which it operates, this unit is provided with at least one supporting element 4b.

Preferably, the supporting element 4b is of the rolling type, i.e. a small wheel, more preferably smaller than the wheels 3.

In embodiments not shown, this supporting element 4b, instead, is a slide or the like.

Hereinafter, therefore, reference will be made to the supporting element by referring indifferently to the rolling element or to the slide.

Other constructional details of the pick-up assembly can be found in publication EP1875794, also in the name of the Applicant and incorporated herein by reference.

Preferably, moreover, the operating units 4 are at least two, connected to the frame 2 and movable towards and away from each other to define a plurality of operating configurations.

An example of the connection between the operating units 4 and the frame 2 is shown in publication US 2015/0319928, also in the name of the Applicant and incorporated herein by reference.

The agricultural machine 1 also comprises a lifting unit 6 operatively interposed between the frame 2 and the wheel 3, or between the frame 2 and the operating unit 4.

This lifting unit 6 is thus associated with the frame 2 and configured to vary the relative height between the frame 2 itself and the wheel 3 and/or the operating unit 4.

More specifically, since the operating unit 4 is connected to the frame 2, and the wheel 3 in each case rests on the ground (i.e. the supporting surface A), in both cases mentioned above the lifting unit 6 is configured to vary the height of the operating unit 4 with respect to the supporting surface A of the machine 1, by lifting the frame 2 or directly lifting the operating unit 4.

According to one aspect of the present invention, the lifting unit 6 comprises at least one hydraulic cylinder 7.

Preferably, the lifting unit 6 comprises at least one hydraulic cylinder 7 associated with each wheel 3 or operating unit 4.

In the illustrated embodiment, the lifting unit 6 comprises two hydraulic cylinders 7 operatively (and physically) interposed between the frame 2 (in particular a support arm 2b) and a respective wheel 3.

In this respect, it should be noted that the wheels 3 are connected to the frame, yet allowing relative movement so as to allow the previously described variation in height.

Preferably, each wheel 3 is pivoted to the frame 2 at one arm 3a, so that the rotation of the arm 3a corresponds to one translation of the wheel 3.

Preferably, the hydraulic cylinder 7 comprises a tubular liner 8 (or pipe) inside which a first 9 and a second piston 10 slide.

It should be noted that hereinafter the structure and functionality of a single cylinder 7 will be described, but the following is applicable to each of the cylinders 7 of the machine 1, if provided with a plurality thereof.

The first 9 and the second piston 10 are therefore slidingly housed inside the liner 8 and arranged in series to define, inside the liner itself, at least a first "C1" and a second chamber "C2".

The second chamber "C2" is preferably delimited, as well as by the side walls of the liner 8, by the second piston 10 and by a back wall of the liner 8.

The first chamber "C1", instead, is at least partly delimited, as well as by the sidewalls of the liner 8, between the first 9 and the second piston 10.

Preferably, the second piston 10 is of the double-acting type.

More precisely, with reference to the preferred embodiment, the second piston 10 is a slider 10a, which hydraulically divides the first "C1" and the second chamber "C2" of the liner 8.

The first piston 9, instead, may be of the single- or double-acting type.

In the preferred embodiment shown herein, such a piston is of the single-acting type, preferably of the plunger type.

In this embodiment, the liner 8 is solely divided into the first and the second chamber.

Alternatively, whether the first piston 9 is of the single or double-acting type, the liner 8 also has a third chamber (not shown) which, in case the first piston is of the single-acting type, is not controlled, whereas when said first piston is of the double-acting type, can be controlled, thus providing additional functionality to the hydraulic cylinder 7.

In any case, it should be noted that the first piston 9 preferably comprises a rod 9a projecting outwards from the liner 8 and connected, at a free end thereof, to the wheel 3, the frame 2 or the operating unit 4.

In the illustrated embodiment, the rod 9a of the first piston 9 is connected to the wheel 3, while the liner 8 of the hydraulic cylinder 7 is connected to the frame 2.

In this way, the extraction or retraction of the rod 9a leads to variation in the relative height between the frame 2 and the wheel 3.

In alternative embodiments, however, the cylinder may be interposed between the frame 2 and the operating unit 4, either under thrust (when the rod 9a is connected to the unit 4) or under traction (when the rod 9a is connected to the frame 2).

It should be noted that, according to one aspect of the present invention, the first piston 9 and the second piston 10 are controllable independently of each other.

Therefore, the relative position of the pistons 9, 10, and therefore the size of the chambers "C1", "C2", varies depending on how said pistons 9, 10 are controlled, thus causing a plurality of operating configurations.

More precisely, the second piston 10 is movable inside the liner 8 so as to vary the volumetric ratio between the first "C1" and the second chamber "C2", thus determining the working stroke of the first piston 9 in the liner 8.

In fact, the first 9 and the second piston 10, since they are arranged "in series" inside the liner 8, actually share the overall working stroke, which can therefore be "modulated" and divided between the first and the second chamber according to the working requirements.

In fact, the cylinder 6 can be switched between a working configuration and a transport configuration.

In the working configuration (FIGS. 1 and 5), the first 9 and the second piston 10 are preferably spaced apart from one another inside the liner 8 so that between them there is a fluid bearing that allows the first piston 9 to oscillate inside the first chamber "C1".

Figure 7:
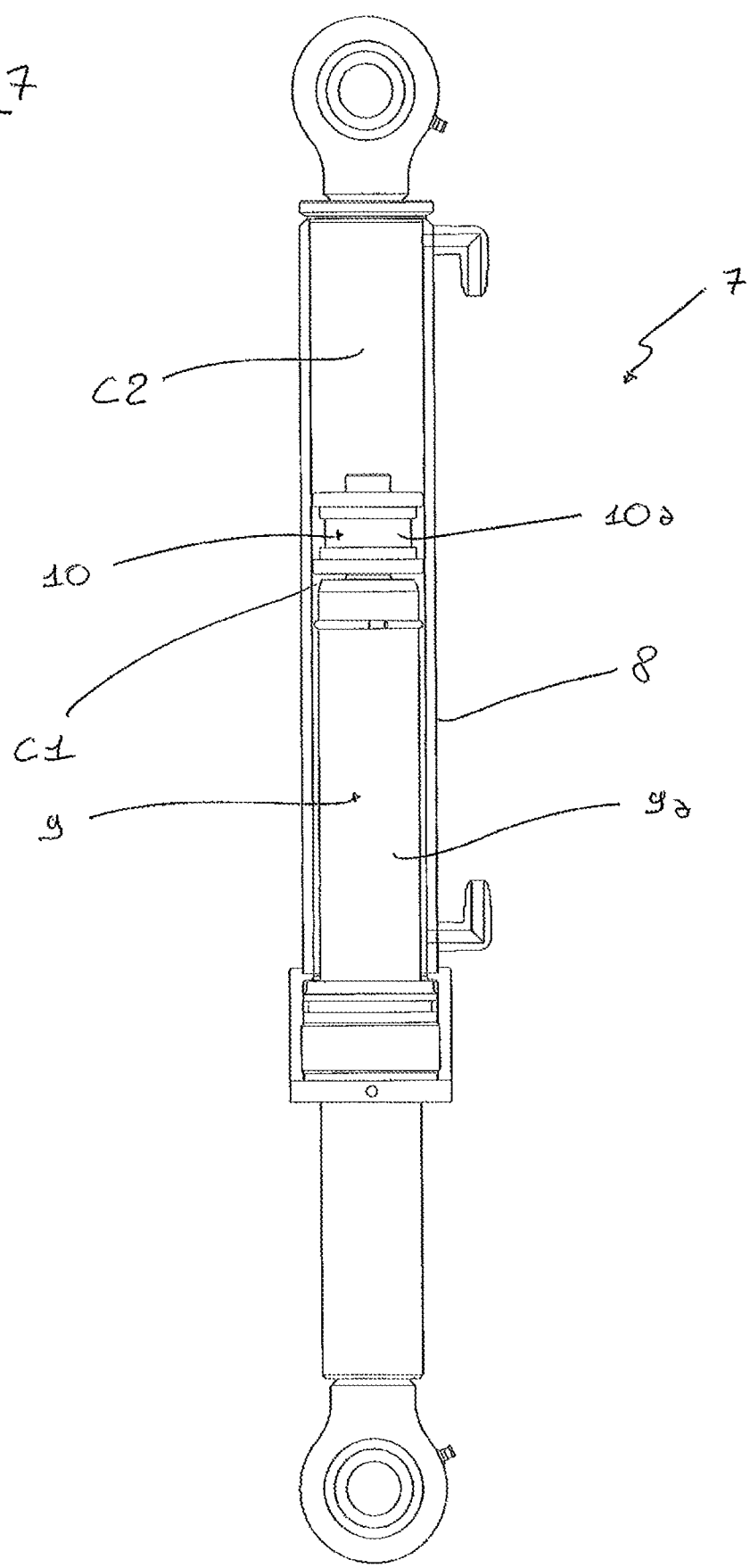

In the transport configuration (FIGS. 4, 7 and 8), the second piston 10 abuts against the first piston 9 so as to prevent any oscillation thereof.

Figure 2:
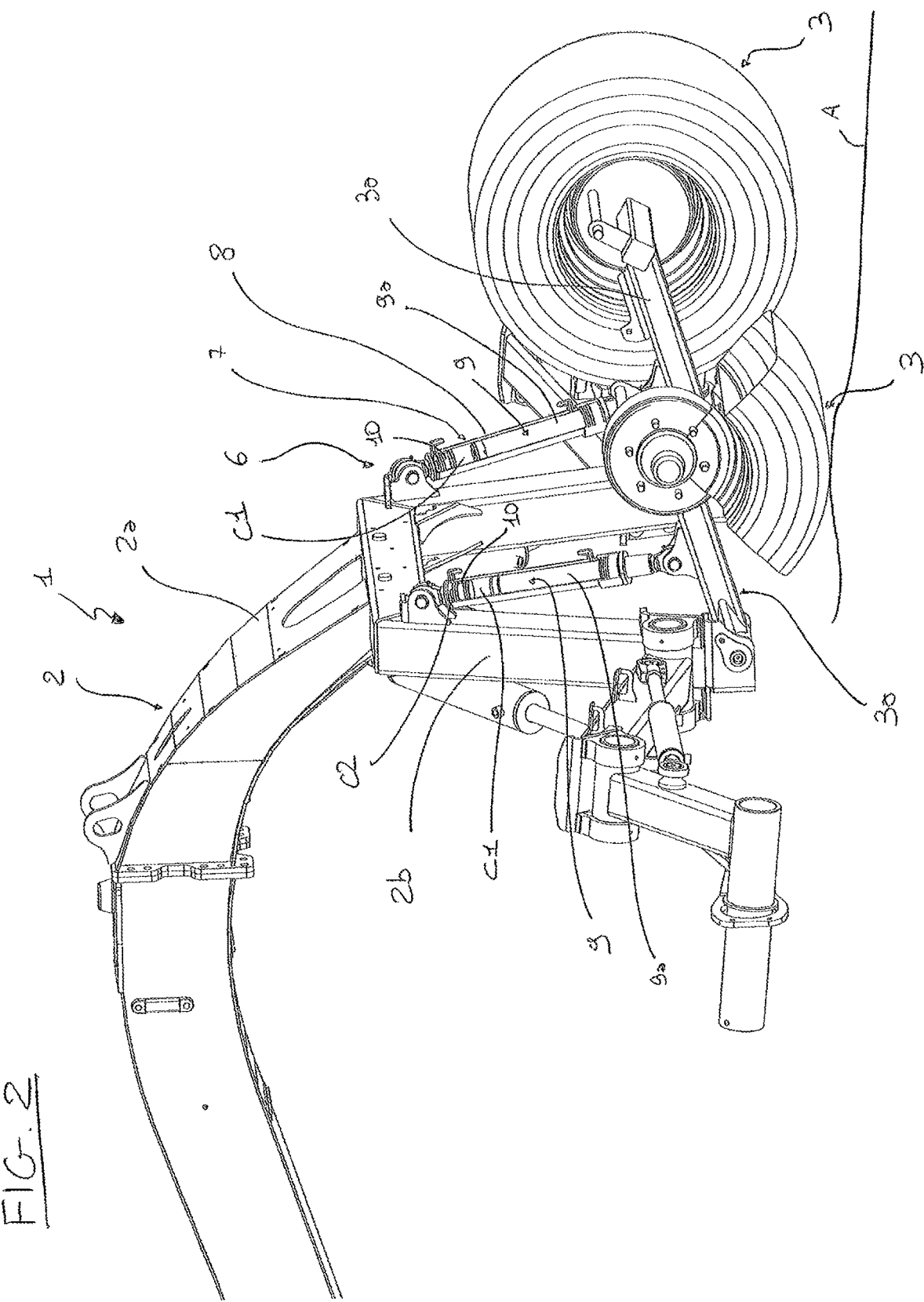
Figure 3:
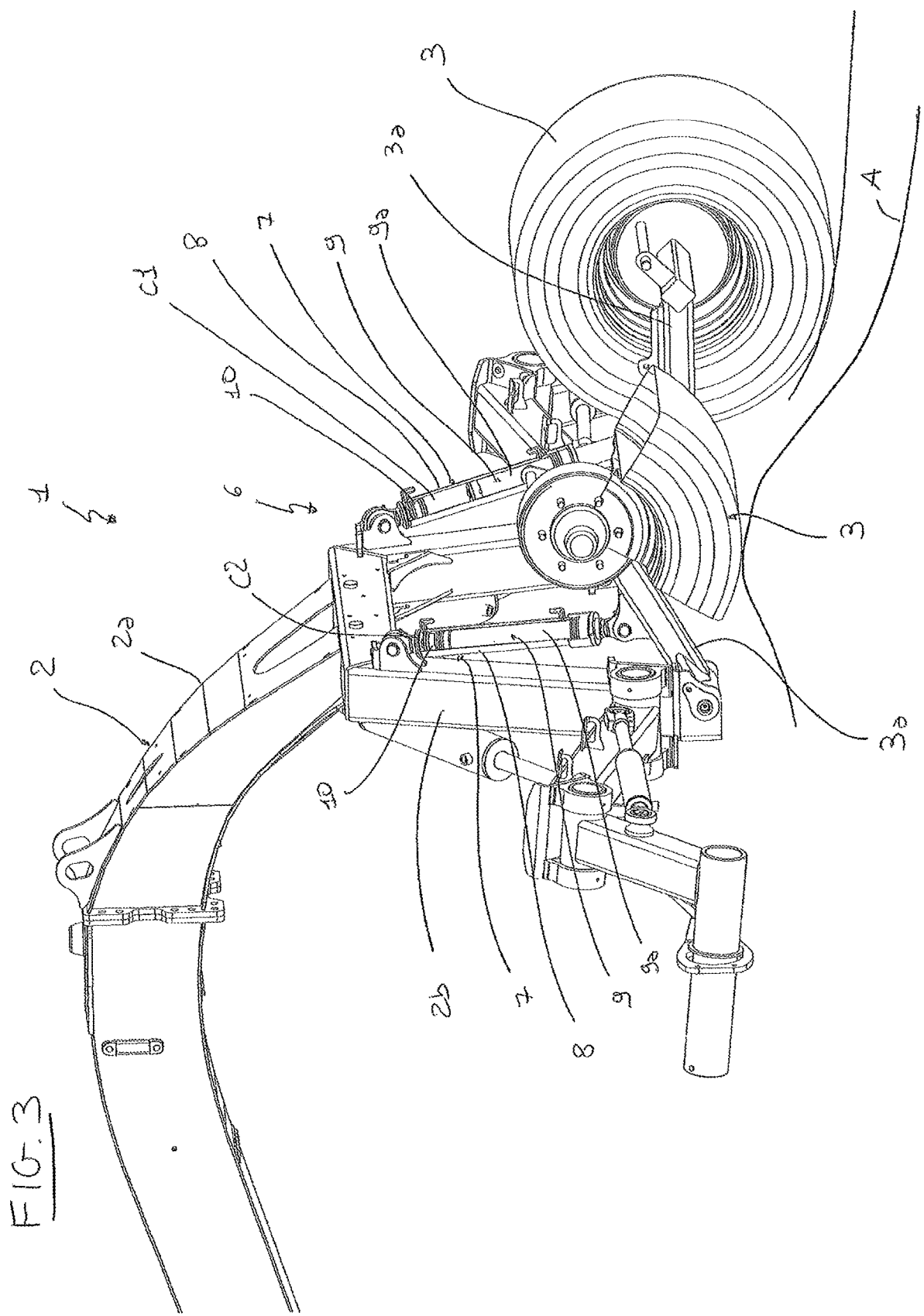
Figure 5:
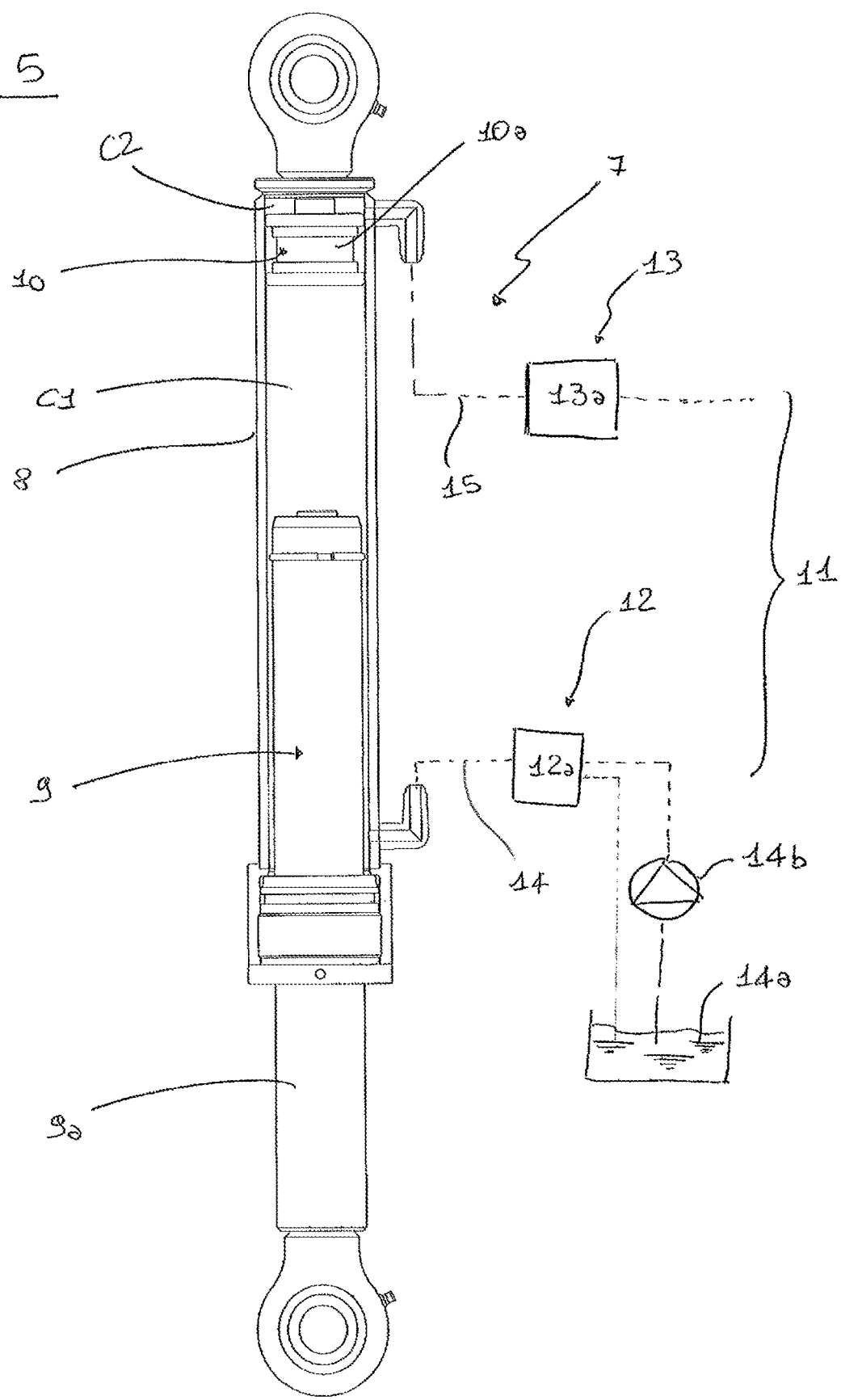
Figure 6:
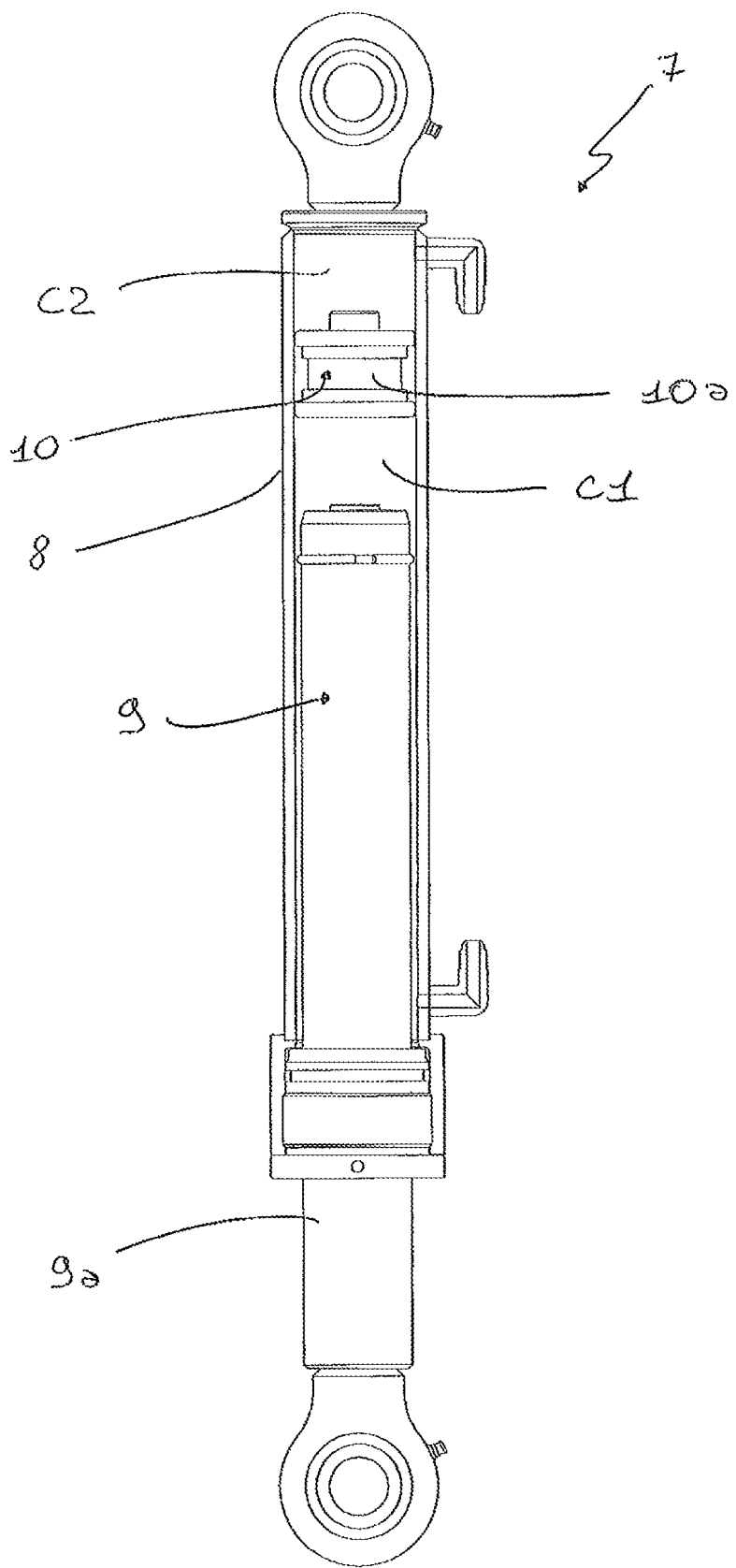

With reference to FIGS. 2, 3 and 5, it can be seen that in a first limit condition of the cylinder 7, the second piston 10 is located in the proximity of (or in abutment against) the back wall of the liner 8 with which it delimits the second chamber "C2", actually making the whole working stroke of the cylinder 7 (or of the liner 8) available to the first piston 9.

On the contrary, in a second limit condition (FIGS. 4 and 8), the second piston 10 is controlled so that it occupies the whole working stroke of the cylinder 7, by abutting against the first piston 9 and pushing it until the volume of the first chamber "C1" is reduced to a minimum.

This condition is considered a transport limit condition, in which the second piston 10 holds the rod 9*a* of the first piston 9 completely extracted, by pressing on it and preventing its oscillatory movement like a suspension.

Figure 4:
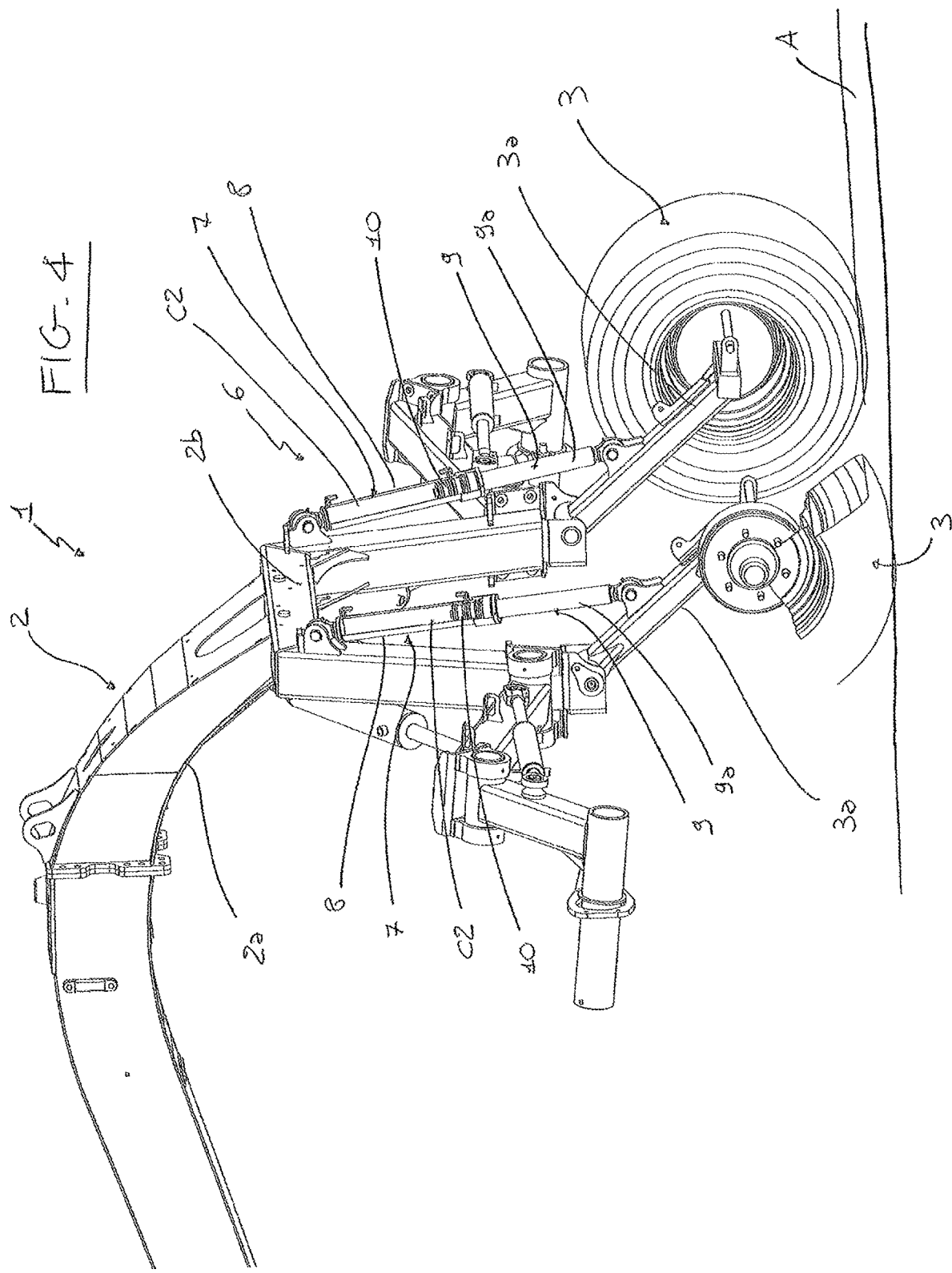
Figure 8:
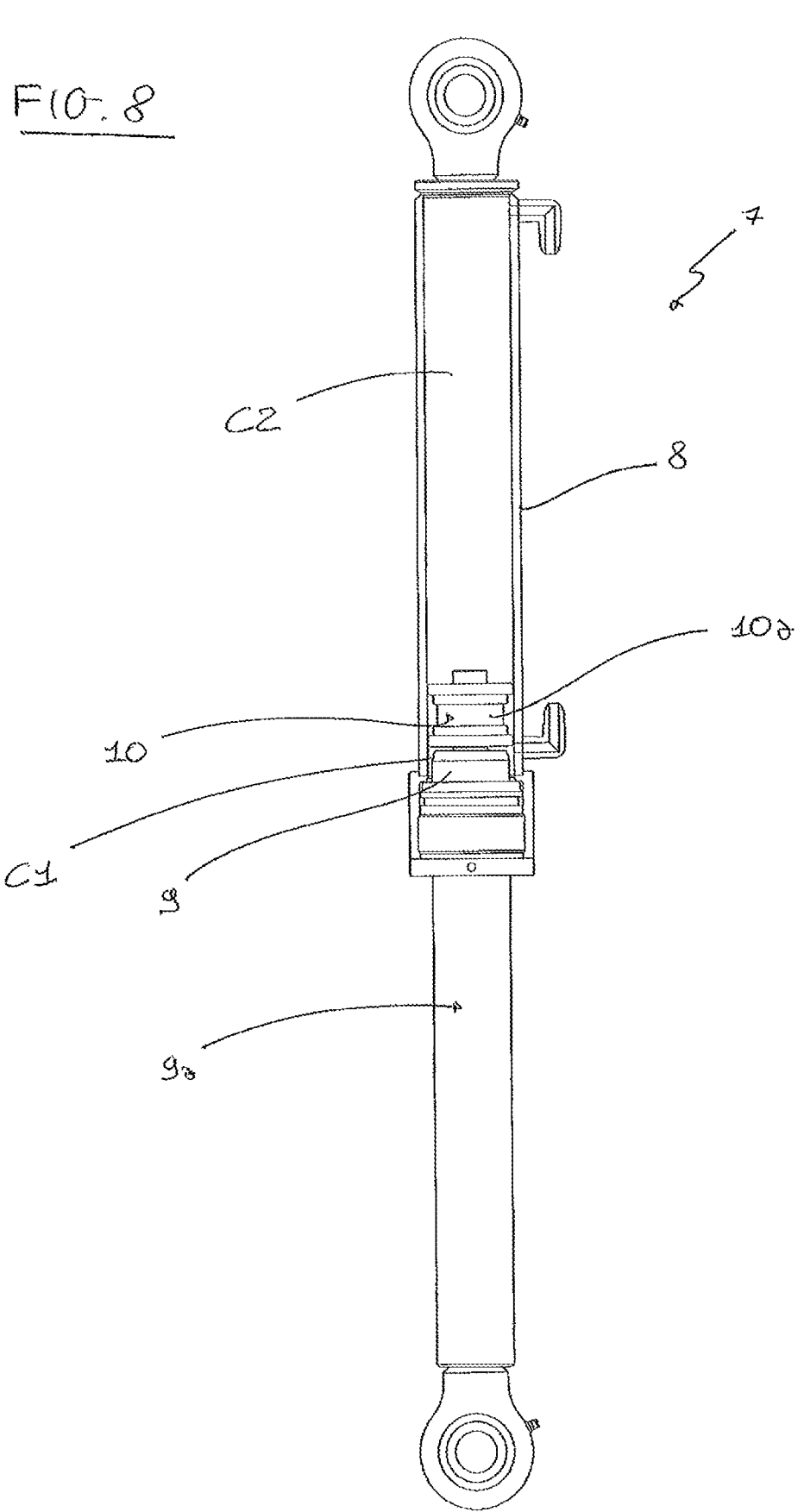

Therefore, the second piston 10 is movable inside the liner 8 between a first limit position, in which the second chamber "C2" has a volume that is substantially zero and the first piston 9 has a maximum working stroke inside the first chamber "C1" (FIGS. 2, 3 and 5), and a second limit position, in which the volume of the first chamber "C1" is reduced to a minimum and the stroke of the first piston 9 is substantially zero (FIGS. 4 and 8).

Preferably, the first chamber "C1" is controlled by pressure, whereas the second chamber "C2" is controlled by volume.

More precisely, the machine comprises a control circuit 11 configured to control the pressure in the first chamber "C1" and the volume of the second chamber "C2".

Advantageously, in this way, the first chamber "C1" (and therefore the first piston 9) acts as a suspension capable of lightening the weight discharged by the operating unit 4 onto the supporting surface "A" through the supporting element 4*b*, whereas the second chamber "C2" determines the positioning height of the operating unit 4.

More specifically, the control circuit 11 comprises at least a first control element 12 for the first chamber "C1", which can be switched between an active configuration, in which it maintains the pressure inside the first chamber around a predetermined value, and a passive condition, in which the first chamber is substantially unloaded.

In the preferred embodiment, this control element 12 is a pressure stabilising valve or pressure stabiliser 12*a*, positioned at the port through which the fluid enters the first chamber "C1", so as to control the inlet or outlet flow.

When the first control element 12 is in the active configuration, it allows the fluid to enter the chamber when the pressure therein falls below the predetermined value, whereas it allows the fluid to exit therefrom when the pressure therein rises above the predetermined value.

Preferably, said "predetermined value" corresponds to the pressure required to support a share of the weight of the operating unit 4.

More preferably, this share is comprised between 50% and 90% of the weight of the operating unit 4. Even more preferably, this share is comprised between 70% and 80% of the weight of the operating unit 4.

Advantageously, in this way, the first piston 9, and therefore the wheel 3, carries most of the weight of the operating unit, leaving the supporting element 4*b* (small wheel or slide) the task of discharging onto the ground (i.e. onto the supporting surface A) only a small fraction of the weight.

In this way, the supporting element 4*b* is able to follow the contour of the ground without sinking into it due to the excess weight (generally having to reduce its size).

In fact, a variation in the conformation of the supporting surface "A", i.e. the ground, corresponds to a variation in the weight discharged onto it by the supporting element 4*b*, which increases in the case of a bump and decreases in the case of a depression.

The aforesaid variation directly affects the cylinder 7, and in particular the first piston 9, which therefore increases or decreases the pressure in the first chamber "C1" in a way that is proportional to the variation.

The control element 12 is thus configured to restore the reference pressure inside the first chamber "C1" by re-balancing the contact forces of the wheel 3 and the supporting element 4*b* on the ground, thereby allowing correct functionality of the operating unit.

Preferably, moreover, the control circuit 11 comprises a second control element 13 for the second chamber "C2", which is configured to carry out a volumetric control of the chamber in order to control the position of the second piston 10 regardless of the pressure inside said second chamber "C2".

Preferably, therefore, the second control element 13 for the second chamber "C2" can be switched between an active configuration, in which it controls the second piston 10 by moving it towards or holding it in a predefined position, and a passive condition, in which the second chamber "C2" is substantially unloaded.

Advantageously, controlling the second chamber "C2" by volume means that the position of the second piston 10 cannot vary with the variation of the pressure in the first chamber "C1", thus allowing the first control element 12 to manage the stroke of the first piston 9 in a completely independent way (unless there are interference issues and mechanical contacts).

To ensure this, the working pressure in the second chamber "C2" is greater than that in the first chamber "C1", and in particular is greater than the above-mentioned "predetermined value" of pressure.

In this way, since the pressure in the first chamber "C1" is constantly oscillating around the "predetermined value" thanks to the action of the first control element 12, the second piston 10 does not undergo an action causing it to give way/be displaced.

In this regard, the second control element 13 preferably comprises a distribution valve, which, when the second piston 10 reaches the predetermined position, is brought into the closed position, thus preventing the flow of fluid from or into the second chamber "C2".

Preferably, each chamber (first "C1" and second "C2") is placed in fluid connection with a respective hydraulic circuit.

In other words, the control circuit 11 comprises at least a first hydraulic circuit 14 connected to the first chamber "C1", and a second hydraulic circuit 15 connected to the second chamber "C2", which can be controlled independently of each other.

In accordance with the above, the second hydraulic circuit 15 has a working pressure greater than that of the first hydraulic circuit.

More precisely, the second hydraulic circuit 15 has a working pressure such as to carry the weight of the operating unit 4, whereas the first hydraulic circuit 14 has a lower working pressure, such as to carry a fraction of said weight, in order to reduce the weight discharged by the operating unit 4 onto the ground during operation.

In this way, as already explained above, during operation a (preponderant) fraction of the weight of the operating unit is discharged onto the first piston 9, therefore onto the wheel 3, while the remaining residual fraction is directly discharged from the unit 4 onto the supporting surface "A" (via the rolling contact element).

With reference to the preferred embodiment, the two cylinders 6 are controlled independently of each other, therefore the control circuit 11 comprises at least three hydraulic circuits, the first one 14 associated with the first chambers "C1" and two second ones 15 associated with the second chambers "C2".

The control of the first single-circuit chambers "C1" is enabled thanks to pressure control, which entails setting the same analogous reference pressure for both the first chambers "C1", which then respond independently to stresses from the ground.

Alternatively, in any case, the first hydraulic circuits may also be two.

Preferably, the first hydraulic circuit(s) 14 is/are totally located on the machine 1.

In other words, the first hydraulic circuit 14 comprises a tank 14a, a pump 14b, piping and valves, all located on the agricultural machine 1.

The second hydraulic circuit(s), instead, is/are preferably placed in fluid (i.e. hydraulic) connection with the hydraulic circuit of the traction unit.

In other words, preferably, at least the tank and the pump of the circuit are located on the traction unit, connected to the second circuit(s) 15 by means of suitable pipes and joints.

The invention achieves the intended objects and attains important advantages.

In fact, the arrangement of a "compact" lifting unit equipped with cylinders that can be controlled independently of each other and provide both the lifting function and the "lightening" function of the small wheels of the operating unit allows the operation of the machine to be improved by reducing the overall dimensions.

Moreover, the use of a single liner, defining a single working stroke, shared by two pistons arranged in series and designed for different functions makes the solution very advantageous from the points of view of compactness, reliability and versatility of use.

The invention claimed is:

1. An agricultural machine comprising:
a frame;
an operating unit connected to the frame;
a wheel or crawler track rotatably attached to the frame to move the machine on a supporting surface;
a lifting unit operatively interposed between the frame and the wheel or crawler track, or between the frame and the operating unit, configured to adjust a height of the operating unit with respect to the supporting surface;
wherein the lifting unit comprises a hydraulic cylinder including:
a liner;
a first piston and a second piston both slidingly housed inside the liner and arranged in series to define a first chamber and a second chamber inside the liner; the first piston and the second piston being controllable independently of each other,
a control circuit including:
a first control element for the first chamber switchable between an active configuration, in which the first control element maintains a pressure in the first chamber around a predetermined value, and a passive configuration, in which the first chamber is unloaded, wherein in the active configuration, the first control element controls the pressure in the first chamber in such a way as to add fluid to the first chamber when the pressure in the first chamber falls below a predetermined value and to remove fluid from the first chamber when the pressure in the first chamber rises above the predetermined value, so that the first piston moves in the first chamber as a force generated on the first piston varies, and
a second control element for the second chamber carrying out a volumetric control of the second chamber and controlling a position of the second piston regardless of a pressure inside the second chamber, wherein the second control element is switchable between an active configuration, in which the second control element controls the second piston by moving the second piston toward a predefined position or by holding the second piston in the predefined position, and a passive configuration, in which the second chamber is unloaded,
wherein the first control element includes a pressure stabilizing valve for controlling the pressure in the first chamber.

2. The agricultural machine as claimed in claim 1, wherein the control circuit further comprises a first hydraulic circuit connected to the first chamber and a second hydraulic circuit connected to the second chamber that are controllable independently of each other.

3. The agricultural machine as claimed in claim 2, wherein the second hydraulic circuit has a working pressure that is higher than a working pressure of the first hydraulic circuit.

4. The agricultural machine as claimed in claim 2, wherein the second hydraulic circuit has a working pressure such as to carry a weight of the operating unit, whereas the first hydraulic circuit has a lower working pressure, such as to carry a fraction of the weight, in order to reduce the weight imposed by the operating unit onto the supporting surface during operation.

5. The agricultural machine as claimed in claim 1, wherein the first piston comprises a rod projecting outwards from the liner and connected, at a free end thereof, to the wheel or crawler track, or to the frame, or to the operating unit.

6. The agricultural machine as claimed in claim 5, wherein the first piston is a single-acting piston and the second piston is a double-acting piston.

7. The agricultural machine as claimed in claim 1, wherein the second piston is movable inside the liner so as to vary a volumetric ratio between the first chamber and the second chamber, thus varying a working stroke of the first piston.

8. The agricultural machine as claimed in claim 7, wherein the second piston is movable inside the liner between a first limit position, in which the second chamber has a volume that is substantially zero and the first piston has a maximum working stroke inside the first chamber, and a second limit position, in which a volume of the first chamber is reduced to a minimum and the working stroke of the first piston is substantially zero.

9. The agricultural machine as claimed in claim 1, wherein the hydraulic cylinder is switchable between a working configuration, in which the first piston and the second piston are spaced apart from one another inside the liner so that between the first piston and the second piston, there is a working fluid bearing that allows the first piston to oscillate inside the first chamber, and a transport configuration, in which the second piston abuts against the first piston so as to prevent any oscillation of the first piston.

10. The agricultural machine as claimed in claim 1, wherein the operating unit comprises a supporting element configured to rest on the supporting surface when the lifting unit is in a working configuration.

11. The agricultural machine as claimed in claim 1, wherein the operating unit comprises pick-up assembly for gathering agricultural products, the pick-up assembly including a plurality of longitudinal prongs and a discharge unit arranged operatively downstream of the pick-up assembly and configured to move the gathered products in a predetermined direction in order to discharge the agricultural products at a sides or at a back of the operating unit.

12. The agricultural machine as claimed in claim 6, wherein the first piston is a plunger piston.

* * * * *